(12) United States Patent
Savchenkov et al.

(10) Patent No.: US 9,360,626 B2
(45) Date of Patent: Jun. 7, 2016

(54) FIBER-BASED MULTI-RESONATOR OPTICAL FILTERS

(76) Inventors: Anatoliy Savchenkov, Glendale, CA (US); David Seidel, Alta Loma, CA (US); Vladimir Ilchenko, Arcadia, CA (US); Andrey B. Matsko, Pasadena, CA (US)

(*) Notice: Subject to any disclaimer, the term of this patent is extended or adjusted under 35 U.S.C. 154(b) by 1902 days.

(21) Appl. No.: 12/270,777

(22) Filed: Nov. 13, 2008

(65) Prior Publication Data

US 2016/0131845 A1    May 12, 2016

(51) Int. Cl.
G02B 6/42    (2006.01)
G01B 11/30    (2006.01)
G02B 6/293    (2006.01)

(52) U.S. Cl.
CPC ........ *G02B 6/29317* (2013.01); *G02B 6/29359* (2013.01)

(58) Field of Classification Search
USPC .......... 385/27, 30, 39; 359/588, 730; 356/519
See application file for complete search history.

(56) References Cited

U.S. PATENT DOCUMENTS

| 5,204,640 A | 4/1993 | Logan, Jr. |
| 5,212,745 A * | 5/1993 | Miller ............................ 385/25 |
| 5,220,292 A | 6/1993 | Bianchini et al. |
| 5,237,630 A * | 8/1993 | Hogg et al. ..................... 385/12 |
| 5,425,039 A | 6/1995 | Hsu et al. |
| 5,723,856 A | 3/1998 | Yao et al. |
| 5,751,747 A | 5/1998 | Lutes et al. |
| 5,777,778 A | 7/1998 | Yao |
| 5,917,179 A | 6/1999 | Yao |
| 5,929,430 A | 7/1999 | Yao et al. |
| 5,985,166 A | 11/1999 | Unger et al. |
| 6,080,586 A | 6/2000 | Baldeschwieler et al. |
| 6,115,122 A * | 9/2000 | Bao et al. ....................... 356/480 |
| 6,137,812 A * | 10/2000 | Hsu et al. ........................... 372/6 |
| 6,178,036 B1 | 1/2001 | Yao |
| 6,203,660 B1 | 3/2001 | Unger et al. |
| 6,389,197 B1 | 5/2002 | Iltchenko et al. |
| 6,417,957 B1 | 7/2002 | Yao |
| 6,456,762 B1 * | 9/2002 | Nishiki et al. ................... 385/37 |

(Continued)

FOREIGN PATENT DOCUMENTS

| JP | 2005-322864 | 11/2005 |
| WO | 01/96936 | 12/2001 |

(Continued)

OTHER PUBLICATIONS

"Wide stop-band filter consisting of multiresonator based on an optical directional coupler", by Furuta et al, Japanese Journal of Applied Physics, vol. 39, pp. 1472-1476, 2000.*

(Continued)

*Primary Examiner* — Robert Tavlykaev

(74) *Attorney, Agent, or Firm* — Fish & Tsang LLP

(57) ABSTRACT

Optical filters comprising one or more optically-coupled Fabry-Perot resonators are disclosed. In some embodiments, the one or more optically coupled Fabry-Perot resonators include a graded index fiber. In some embodiments, the one or more optically coupled Fabry-Perot resonators are coupled end-to-end, whereas in other embodiments the one or more optically coupled Fabry-Perot resonators are side-coupled through evanescence. One or more implementations of an optical filter allow a spectral response of an input light beam to be controlled, through various approaches, e.g., by exposing a component fiber to ultra-violet radiation.

22 Claims, 2 Drawing Sheets

(56) References Cited

U.S. PATENT DOCUMENTS

| | | | |
|---|---|---|---|
| 6,473,218 | B1 | 10/2002 | Maleki et al. |
| 6,476,959 | B2 | 11/2002 | Yao |
| 6,487,233 | B2 | 11/2002 | Maleki et al. |
| 6,488,861 | B2 | 12/2002 | Itchenko et al. |
| 6,490,039 | B2 | 12/2002 | Maleki et al. |
| 6,535,328 | B2 | 3/2003 | Yao |
| 6,567,436 | B1 | 5/2003 | Yao et al. |
| 6,580,532 | B1 | 6/2003 | Yao et al. |
| 6,594,061 | B2 | 7/2003 | Huang et al. |
| 6,678,441 | B1 | 1/2004 | Taylor |
| 6,762,869 | B2 | 7/2004 | Maleki et al. |
| 6,795,481 | B2 | 9/2004 | Maleki et al. |
| 6,798,947 | B2 | 9/2004 | Iltchenko |
| 6,853,479 | B1 | 2/2005 | Ilchenko et al. |
| 6,871,025 | B2 | 3/2005 | Maleki et al. |
| 6,873,631 | B2 | 3/2005 | Yao et al. |
| 6,879,752 | B1 | 4/2005 | Ilchenko et al. |
| 6,901,189 | B1 | 5/2005 | Savchenkov et al. |
| 6,906,309 | B2 | 6/2005 | Sayyah et al. |
| 6,922,497 | B1 | 7/2005 | Savchenkov et al. |
| 6,928,091 | B1 | 8/2005 | Maleki et al. |
| 6,943,934 | B1 | 9/2005 | Ilchenko et al. |
| 6,985,235 | B2 * | 1/2006 | Bao et al. ............ 356/480 |
| 6,987,914 | B2 | 1/2006 | Savchenkov et al. |
| 7,024,069 | B2 | 4/2006 | Savchenkov et al. |
| 7,043,117 | B2 | 5/2006 | Matsko et al. |
| 7,050,212 | B2 | 5/2006 | Matsko et al. |
| 7,061,335 | B2 | 6/2006 | Maleki et al. |
| 7,062,131 | B2 | 6/2006 | Ilchenko |
| 7,092,591 | B2 | 8/2006 | Savchenkov et al. |
| 7,133,180 | B2 | 11/2006 | Ilchenko et al. |
| 7,173,749 | B2 | 2/2007 | Maleki et al. |
| 7,184,451 | B2 | 2/2007 | Ilchenko et al. |
| 7,187,870 | B2 | 3/2007 | Ilchenko et al. |
| 7,218,662 | B1 | 5/2007 | Ilchenko et al. |
| 7,248,763 | B1 | 7/2007 | Kossakovski et al. |
| 7,260,279 | B2 | 8/2007 | Gunn et al. |
| 7,283,707 | B1 | 10/2007 | Maleki et al. |
| 7,369,722 | B2 | 5/2008 | Yilmaz et al. |
| 7,389,053 | B1 | 6/2008 | Ilchenko et al. |
| 7,400,796 | B1 | 7/2008 | Kossakovski et al. |
| 7,440,651 | B1 | 10/2008 | Savchenkov et al. |
| 7,460,746 | B2 | 12/2008 | Maleki et al. |
| 2001/0038651 | A1 | 11/2001 | Maleki et al. |
| 2002/0003643 | A1 * | 1/2002 | Qian et al. ............ 359/127 |
| 2002/0018611 | A1 | 2/2002 | Maleki et al. |
| 2002/0018617 | A1 | 2/2002 | Iltchenko et al. |
| 2002/0021765 | A1 | 2/2002 | Maleki et al. |
| 2002/0081055 | A1 | 6/2002 | Painter et al. |
| 2002/0085266 | A1 | 7/2002 | Yao |
| 2002/0097401 | A1 | 7/2002 | Maleki et al. |
| 2003/0160148 | A1 | 8/2003 | Yao et al. |
| 2004/0100675 | A1 | 5/2004 | Matsko et al. |
| 2004/0109217 | A1 | 6/2004 | Maleki et al. |
| 2004/0218880 | A1 | 11/2004 | Matsko et al. |
| 2004/0240781 | A1 | 12/2004 | Savchenkov et al. |
| 2005/0017816 | A1 | 1/2005 | Ilchenko et al. |
| 2005/0063034 | A1 | 3/2005 | Maleki et al. |
| 2005/0074200 | A1 | 4/2005 | Savchenkov et al. |
| 2005/0123306 | A1 | 6/2005 | Ilchenko et al. |
| 2005/0128566 | A1 | 6/2005 | Savchenkov et al. |
| 2005/0175358 | A1 | 8/2005 | Ilchenko et al. |
| 2005/0248823 | A1 | 11/2005 | Maleki et al. |
| 2007/0009205 | A1 | 1/2007 | Maleki et al. |
| 2007/0153289 | A1 | 7/2007 | Yilmaz et al. |
| 2008/0001062 | A1 | 1/2008 | Gunn et al. |
| 2008/0075464 | A1 | 3/2008 | Maleki et al. |
| 2008/0310463 | A1 | 12/2008 | Maleki et al. |

FOREIGN PATENT DOCUMENTS

| | | |
|---|---|---|
| WO | 2005/038513 | 4/2005 |
| WO | 2005/055412 | 6/2005 |
| WO | 2005/067690 | 7/2005 |
| WO | 2005/122346 | 12/2005 |
| WO | 2006/076585 | 7/2006 |
| WO | 2007/143627 | 12/2007 |

OTHER PUBLICATIONS

"Parallel-coupled transmission-line-resonator filter," by Cohn, IRE Transaction on Microwave Theory and Techniques, vol. 6, No. 2, pp. 223-231, 1958.*

Braginsky, V.B., et al., "Quality-Factor and Nonlinear Properties of Optical Whispering-Gallery Modes," *Physics Letters A*, 137(7, 8):393-397, May 1989.

Eliyahu, D., et al., "Low Phase Noise and Spurious Levels in Multi-Loop Opto-Electronic Oscillators," *Proceedings of the 2003 IEEE International Frequency Control Sympsoium and PDA Exhibition*, pp. 405-410, May 2003.

Eliyahu, D., et al., "Modulation Response ($S_{21}$) of the Coupled Opto-Electronic Oscillator," *Proceedings of the 2005 IEEE International Frequency Control Symposium and Exposition*, pp. 850-856, Aug. 2005.

Eliyahu, D., et al., "Tunable, Ultra-Low Phase Noise YIG Based Opto-Electronic Oscillator," *IEEE MTT-S International Microwave Symposium Digest*, 3:2185-2187, Jun. 2003.

Gorodetsky, M.L., et al., "Optical Microsphere Resonators: Optimal Coupling to High-$Q$ Whispering-Gallery Modes," *J.Opt. Soc. Am. B*, 16(1):147-154, Jan. 1999.

Gorodetsky, M.L., et al., "Rayleigh Scattering in High-$Q$ Microspheres," *J. Opt. Soc. Am. B*, 17(6):1051-1057, Jun. 2000.

Gorodetsky, M.L., et al., "Ultimate $Q$ of Optical Microsphere Resonators," *Optics Letters*, 21(7):453-455, Apr. 1996.

Hryniewicz, J.V., et al., "Higher Order Filter Response in Coupled Microring Resonators," *IEEE Photonics Technology Letters*, 12(3):320-322, Mar. 2000.

Huang, S., et al., "A 'Turnkey' Optoelectronic Oscillator with Low Acceleration Sensitivity," *2000 IEEE/EIA International Frequency Control Symposium and Exhibition*, pp. 269-279, Jun. 2000.

Ilchenko, V., et al., "Electrooptically Tunable Photonic MicroresonOE 118ators and Photonic Bandgap Waveguide Coupling for Micro-Optoelectronic Oscillators," *GOMACTech 2003*, Tampa, Florida, pp. 1-4.

Ilchenko, V., et al., "High-Q Microsphere Cavity for Laser Stabilization and Optoelectronic Microwave Oscillator," *Proceedings SPIE Microresonators and Whispering-Gallery Modes*, vol. 3611, pp. 190-198, Jan. 1999.

Ilchenko, V., et al., "Microsphere Integration in Active and Passive Photonics Devices," *Proc. of SPIE Laser Resonators III*, vol. 3930, pp. 154-162, Jan. 2000.

Ilchenko, V., et al., "Microtorus: A High-Finesse Microcavity with Whispering-Gallery Modes," *Optics Letters*, 26(5):256-258, Mar. 2001.

Ilchenko, V., et al., "Pigtailing the High-$Q$ Microsphere Cavity: A Simple Fiber Coupler for Optical Whispering-Gallery Modes," *Optics Letters*, 24(11):723-725, Jun. 1999.

Ilchenko, V., et al., "Tunability and Synthetic Lineshapes in High-Q Optical Whispering Gallery Modes," *Proc. of SPIE Laser Resonators and Beam Control VI*, vol. 4969, pp. 195-206, Jan. 2003.

Ilchenko, V., et al., "Whispering-Gallery-Mode Electro-Optic Modulator and Photonic Microwave Receiver," *J. Opt. Soc. Am. B*, 20(2):333-342, Feb. 2003.

Ilchenko, V., et al., "Sub-Micro Watt Photonic Microwave Receiver," *IEEE Photonics Technology Letters*, 14(11):1602-1604, Nov. 2002.

Ito, H., et al., "InP/InGaAs Uni-Travelling-Carrier Photodiode with 310 GHz Bandwidth," *Electronics Letters*, 36(21):1809-1810, Oct. 2000.

Logan, R., et al., "Stabilization of Oscillator Phase Using a Fiber-Optic Delay-Line," *IEEE 45th Annual Symposium on Frequency Control*, pp. 508-512, May 1991.

Maleki, L., "The Opto-Electronic Oscillator: Prospects for Extending the State of the Art in Reference Frequency Generation," *International Topical Meeting on Microwave Photonics*, pp. 195-198, Oct. 1998.

Matsko, A., et al., "Active Mode Locking with Whispering-Gallery Modes," *J. Opt. Soc. Am. B*, 20(11):2292-2296, Nov. 2003.

(56) References Cited

OTHER PUBLICATIONS

Matsko, A., et al., "Whispering-Gallery-Mode based Optoelectronic Microwave Oscillator," *Journal of Modern Optics*, 50(15-17):2523-2542, Feb. 2004.

Matsko, A., et al., "Whispering-Gallery-Mode Resonators as Frequency References. I. Fundamental Limitations," *J. Opt. Soc. Am. B*, 24(6):1324-1335, Jun. 2007.

Myers, L.E., et al., "Quasi-Phase-Matched Optical Parametric Oscillators in Bulk Periodically Poled $LiNbO_3$," *J. Opt. Soc. Am. B*, 12(11):2102-2116, Nov. 1995.

Savchenkov, A., et al., "Whispering-Gallery-Mode Resonators as Frequency References. II. Stabilization," *J. Opt. Soc. Am. B*, 24(12):2988-2997, Dec. 2007.

Vassiliev, V.V., et al., "Narrow-Line-Width Diode Laser with a High-$Q$ Microsphere Resonator," *Optics Communications*, 158(1-6):305-312, Dec. 1998.

Yao, X.S., et al., "A Novel Photonic Oscillator," *Digest of the LEOS Summer Topical Meetings*, pp. 17-18, Aug. 1995.

Yao, X.S., et al., "A Novel Photonic Oscillator," *TDA Progress Report* 42-122, pp. 32-43, Aug. 1995.

Yao, X.S., et al., "Converting Light into Spectrally Pure Microwave Oscillation," *Optics Letters*, 21(7):483-485, Apr. 1996.

Yao, X.S., et al., "Coupled Optoelectronic Oscillators for Generating Both RF Signal and Optical Pulses," *Journal of Lightwave Tecnhology*, 18(1):73-78, Jan. 2000.

Yao, X.S., et al., "Dual Microwave and Optical Oscillator," *Optics Letters*, 22(24):1867-1869, Dec. 1997.

Yao, X.S., et al., "Multiloop Optoelectronic Oscillator," *IEEE Journal of Quantum Electronics*, 36(1):79-84, Jan. 2000.

Yao, X.S., et al., "Optoelectronic Microwave Oscillator," *J. Opt. Soc. Am. B*, 13(8):1725-1735, Aug. 1996.

Yao, X.S., et al., "Optoelectronic Oscillator for Photonic Systems," *IEEE Journal of Quantum Electronics*, 32(7):1141-1149, Jul. 1996.

Yu, J., et al., "Compact Optoelectronic Oscillator with Ultra-Low Phase Noise Performance," *Electronics Letters*, 35(18):1554-1555, Sep. 1999.

International Search Report and Written Opinion dated Apr. 30, 2009 for International Application No. PCT/US2008/083470, filed Nov. 13, 2008 (7 pages).

\* cited by examiner

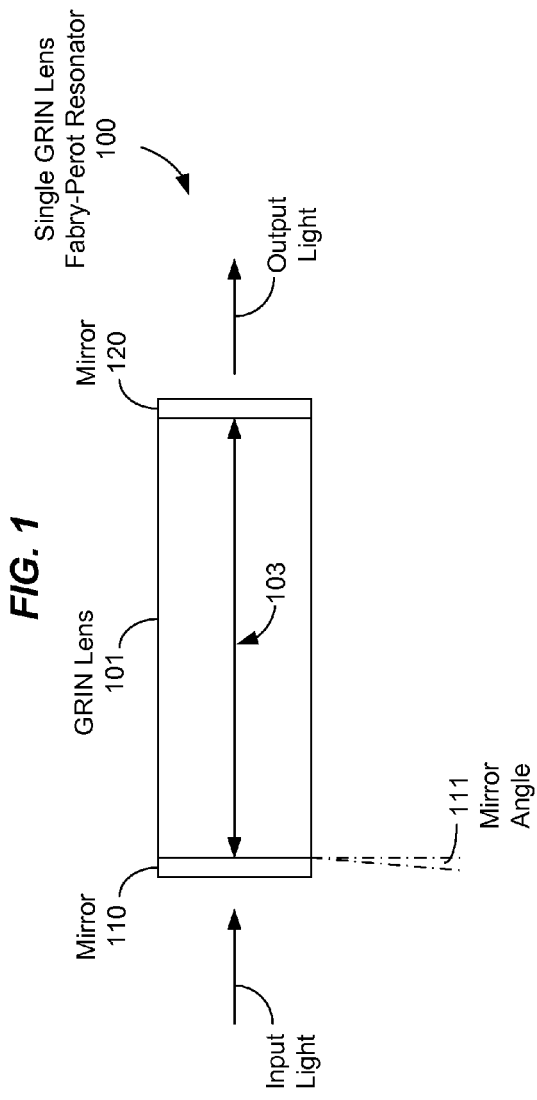
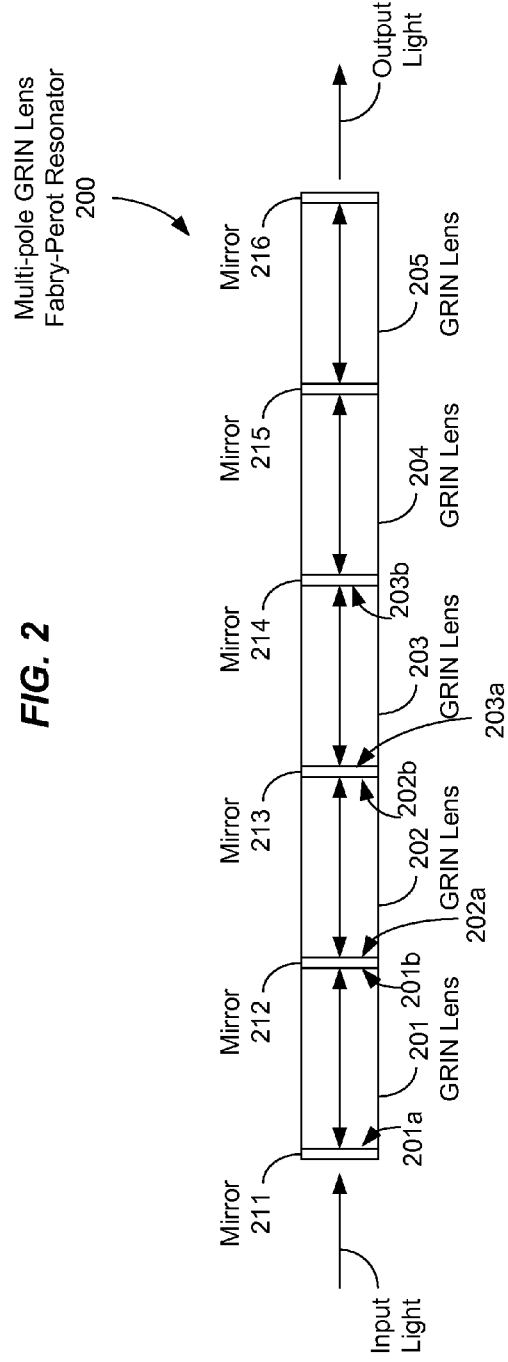

FIBER-BASED MULTI-RESONATOR OPTICAL FILTERS

FEDERALLY SPONSORED RESEARCH OR DEVELOPMENT

This invention was made with government support under Grant No. N66001-07-C-2049 awarded by The Defense Advanced Research Projects Agency (DARPA). The government has certain rights in the invention.

PRIORITY CLAIM AND RELATED APPLICATION

This document is a U.S. patent application and claims the benefits of the U.S. Provisional Application No. 61/002,917 entitled "Miniature GRIN Lens Multipole Filter" and filed Nov. 13, 2007, which is incorporated herein by reference in its entirety.

BACKGROUND

This disclosure relates to optical components and methods for optical filtering.

Generally, Fabry-Perot resonators confine light between at least two reflectors separated by a distance. The separation distance of the reflectors can define which frequencies constructively interfere to produce the stable modes (Eigen modes) of the resonator cavity. Fabry-Perot resonators are used in lasers, amplifiers, interferometers, and other optical instruments where a standing wave cavity is necessitated or useful. In some cases, such resonators provide broadband radiation depending on the materials used in the cavity, the reflectivity of the reflectors, and other factors. Microchip and microcavity lasers can be formed of Fabry-Perot resonators in small packages by providing partially optically-reflective coatings to either end of a transmissive material such as an optical fiber or waveguide.

SUMMARY

This document describes optical devices and methods for controlling a spectral response of an optical device. In a first aspect, an optical device includes a first fiber Fabry-Perot resonator comprising a first fiber segment, a first reflector formed on a first end facet of the first fiber segment and a second reflector formed on a second end facet of the first fiber segment; and a second fiber Fabry-Perot resonator optically coupled to the first fiber Fabry-Perot resonator, the second fiber Fabry-Perot resonator comprising a second fiber segment oriented to be parallel to the first fiber segment and located to have a portion that is optically evanescently coupled to the first fiber segment, a third reflector formed on a first end facet of the second fiber segment and a fourth reflector formed on a second end facet of the second fiber segment.

Implementations can include any, all, or none of the following features. The first fiber segment can be a single-mode fiber segment. The first fiber segment can be a multi-mode fiber segment. The first fiber segment can be a single-mode gradient index fiber segment. The first fiber segment can be a multi-mode gradient index fiber segment. The first fiber segment can be a single-mode gradient index lens. The first fiber segment can be a multi-mode gradient index lens. The optical device can include a third fiber Fabry-Perot resonator optically coupled to the second fiber Fabry-Perot resonator, the third fiber Fabry-Perot resonator comprising a third fiber segment oriented to be parallel to the second fiber segment and located to have a portion that is optically evanescently coupled to the second fiber segment, a fifth reflector formed on a first end facet of the third fiber segment and a sixth reflector formed on a second end facet of the third fiber segment.

In a second aspect, an optical device includes a first fiber segment, a first reflector formed on a first end facet of the first fiber segment, a second reflector formed on a second end facet of the first fiber segment and being partially reflective and partially transmissive, a second fiber segment oriented to be parallel to the first fiber segment and located downstream from the first fiber segment to receive light from the first fiber segment, the second fiber segment having a first end facet in contact with the second reflector and a second end facet, and a third reflector formed on the second end facet of the second fiber segment.

Implementations can include any, all, or none of the following features. The first fiber segment can be a single-mode fiber segment. The first fiber segment can be a multi-mode fiber segment. The first fiber segment can be a single-mode gradient index fiber segment. The first fiber segment can be a multi-mode gradient index fiber segment. The first fiber segment can be a single-mode gradient index lens. The first fiber segment can be a multi-mode gradient index lens. The first, second and third reflectors can have different reflectivities.

In a third aspect, a method for setting a spectral response of an optical device includes providing a first fiber Fabry-Perot resonator that comprises a first fiber segment, a first reflector formed on a first end facet of the first fiber segment which changes a refractive index under illumination of UV light and a second reflector formed on a second end facet of the first fiber segment, optically coupling a second fiber Fabry-Perot resonator to the first fiber Fabry-Perot resonator, the second fiber Fabry-Perot resonator comprising a second fiber segment oriented to be parallel to the first fiber segment and located to have a portion that is optically evanescently coupled to the first fiber segment, a third reflector formed on a first end facet of the second fiber segment and a fourth reflector formed on a second end facet of the second fiber segment, exposing the first fiber segment to the UV light to change the refractive index to tune a spectral response collectively produced by the coupled first and second fiber Fabry-Perot resonators.

Implementations can include any, all, or none of the following features. The method can include changing a stress in at least one of the first and second fiber segments, in addition to the exposure of the first fiber segment to the UV light, to tune the spectral response collectively produced by the coupled first and second fiber Fabry-Perot resonators.

In a fourth aspect, a method for controlling a spectral output of an optical device includes providing a first length of fiber having a first reflector formed on a first end facet of the first fiber segment and a second reflector formed on a second end facet of the first fiber segment and being partially reflective and partially transmissive. The method further includes optically coupling a second length of fiber to the first length of fiber, wherein the second length of fiber is oriented to be parallel to, and located downstream from the first length of fiber to receive light from the first length of fiber, the second length of fiber having a first end facet in contact with the second reflector and a second end facet, and providing a third reflector formed on the second end facet of the second length of fiber; wherein the lengths of the first and second fiber lengths are selected to achieve desired resonance condition, and thereby a desired output spectral response.

In a fifth aspect, a method for setting a spectral response of an optical device includes providing a first fiber Fabry-Perot resonator that comprises a first fiber segment, a first reflector formed on a first end facet of the first fiber segment which changes a refractive index under illumination of UV light and a second reflector formed on a second end facet of the first fiber segment, optically coupling a second fiber Fabry-Perot resonator to the second end facet of the first fiber Fabry-Perot resonator, the second fiber Fabry-Perot resonator comprising a second fiber segment oriented to be downstream of the first fiber segment, a third reflector formed on a first end facet of the second fiber segment and a fourth reflector formed on a second end facet of the second fiber segment, and exposing the first fiber segment to the UV light to change the refractive index to tune a spectral response collectively produced by the coupled first and second fiber Fabry-Perot resonators.

Implementations can include any, all, or none of the following features. The method can include changing a stress in at least one of the first and second fiber segments, in addition to the exposure of the first fiber segment to the UV light, to tune the spectral response collectively produced by the coupled first and second fiber Fabry-Perot resonators.

DESCRIPTION OF DRAWINGS

FIG. 1 is a single GRIN lens Fabry-Perot resonator, according to one embodiment.

FIG. 2 is a multi-pole GRIN lens Fabry-Perot resonator, according to one embodiment.

DETAILED DESCRIPTION

Figure 3:
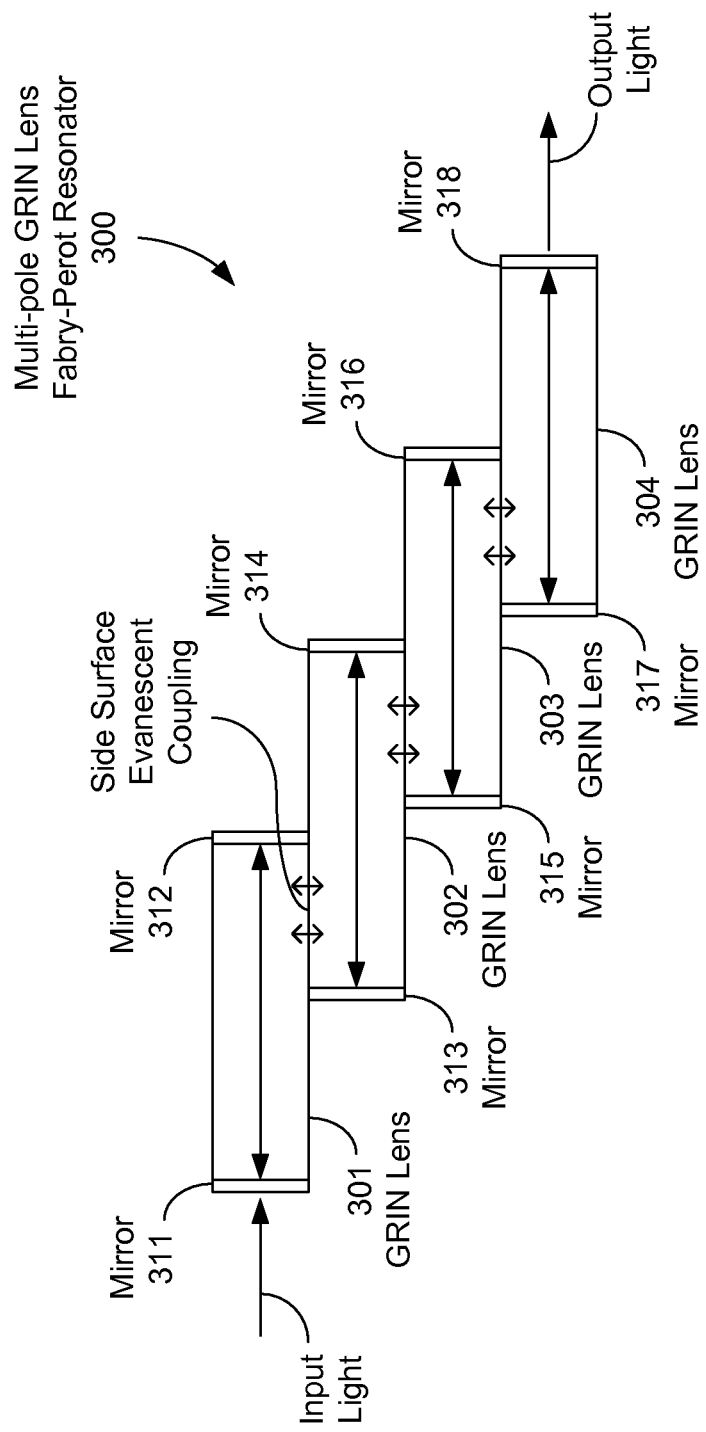
FIG. 3 is a multi-pole GRIN lens Fabry-Perot Resonator, according to one embodiment.

Fiber based filters in multi-pole configurations are described, including examples of multi-pole graded index (GRIN) filters. Such a filter can be used for producing a desired spectral response (e.g., output) from two or more Fabry-Perot-type resonators.

Referring to FIG. 1, a single GRIN lens Fabry-Perot resonator 100 includes a GRIN lens 101 bounded on opposing sides by a first reflector 110 and a second reflector 120. The GRIN lens 101 can be an optical fiber of sufficient quality and characteristic to propagate light along a long axis of the fiber. Non-limiting examples of fibers that can be used in any of the described embodiments to form a GRIN lens 101 include single mode fibers, multi-mode fibers, single-mode gradient index fibers, and multi-mode gradient index fibers. In some implementations, the GRIN lens 101 can be a single mode gradient index lens; in other implementations, the multi-mode gradient index lenses can be used.

The first reflector 110 can be offset at a reflector angle 111 from normal to an optical axis 103 of the GRIN lens 101. Offsetting the first reflector 110 by the reflector angle 111 can reduce the likelihood of optical feedback to the light source while maintaining acceptable resonance characteristics. In some cases, however, the angled reflector can lead to displacement of the optical axis.

As light enters the resonator 100 from the left (as illustrated in FIG. 1), it passes through the first reflector 110, which can be a partially transmissive mirror, for example. The refractive index of the GRIN lens 101 decreases radially from the center of the lens, e.g., as measured from the optical axis toward an outer circumference of the lens. This structure produces a converging lensing effect that focuses light as it propagates through the material, e.g., from the first reflector 110 toward the second reflector 120. Light is reflected by the second reflector 120 towards the first reflector 110, thereby establishing a resonance cavity condition. Depending on the length and other factors of the GRIN lens 101 as described below, and the bandwidth of the input light, certain frequencies of the input light become predominant through constructive and destructive interference.

In some cases, the second reflector 120 can be partially transmissive, allowing a portion of the light to escape the resonant cavity. Generally, the single GRIN lens Fabry-Perot resonator 100 can function as a light filter, as some of the input light frequencies are lost due to destructive interference within the Fabry-Perot cavity, i.e., those frequencies that do not satisfy the resonance condition $$m\left(\frac{\lambda}{2}\right) = L,$$

where L is the length of the cavity, λ is the wavelength, and m is an integer. Accordingly, by selecting an appropriate length of the GRIN lens 101, certain pre-determined light frequencies can be selectively filtered from the input light source.

The resonance conditions of the Fabry-Perot cavity within the single GRIN lens Fabry-Perot resonator can be affected by other factors. For example, multimode fibers made of Ge-doped fused silica can be sensitive to ultra-violet (UV) light, where the refractive index of the fiber can be altered upon being irradiated with UV light. Each hydrogen saturated fiber can be exposed to UV light (e.g., laser or Xe-lamp in the range of 200-350 nm) to adjust the refractive index of the fiber core. The tunability of the refractive index can occur at a rate of $10^{-2}$, which corresponds to a 2 THz resonance frequency shift at 1550 nm. Thus, the resonance frequency of each GRIN lens 101 segment can be tuned using a semi- or non-transparent mask with an exposed window to irradiate a particular segment.

In other implementations, mechanical stress and/or exposure to certain frequencies of light can affect the resonance condition of resonator. For example, exposure to 10 μm light can permanently shift the frequency of any fused resonator, e.g., a resonator formed at least in part of fused silica, by 10% or more. To apply stress, heat can be applied at gradient fiber multipole fabry-perot resonator. The softened glass leaks under external stress and the length of the resonator increases, thus changing the resonance condition.

Referring now to FIG. 2, a multi-pole GRIN lens Fabry Perot resonator 200 (hereinafter "multi-pole resonator") includes two or more single GRIN lens Fabry-Perot resonators 100 arranged such that they are optically coupled. In one embodiment, a multi-pole resonator 200 includes two or more single GRIN lens Fabry-Perot resonators 100 with their ends coupled together in series, as shown in FIG. 2. Such a configuration can lead to optical coupling of a first fiber segment 201 with a second fiber segment 202 located downstream of the first fiber segment 201.

A multi-pole resonator 200 includes a first reflector 211 formed on a first end facet of a first fiber segment 201 (a GRIN lens, as shown in FIG. 2). A second reflector 212 optically couples a second end facet 201b of the first fiber segment 201 with a first end facet 202a of a second fiber segment 202. A third reflector 213 couples the second fiber segment 202 with a third fiber segment 203 and so on. In some embodiments, for reflectors that optically couple two fiber segments together, opposing sides of the reflector can be formed on an end facet of each of the two fiber segments.

A multi-pole resonator 200 can provide a compound optical filter. For example, when several GRIN lenses are serially joined (as in FIG. 2), an optical variant of a Butterworth filter can be achieved, e.g., by selection of reflector, fiber, and other parameters as described above, the optical frequency response can be tuned to approach a square waveform. In such an implementation, each reflector (e.g., reflectors 211-216) can have a specific value. In some implementations, the reflectivity of each reflector is different, giving rise to variable frequency selection and response throughout the entire multi-pole resonator 200.

In some implementations of a multi-pole resonator 200, it can be important to ensure that light can propagate through each fiber segment (e.g., fibers 201-205 in FIG. 2) to achieve a flat-topped frequency spectral response bounded by a sharp frequency cut-off. In some implementations of a multi-pole resonator 200 that employ gradient index structures (such as GRIN lenses or other gradient index waveguides), the positioning of the beam focus is a variable that can affect overall coupling losses and should be considered. To address this issue, in one implementation of a multi-pole resonator 200 all the elements of the multi-pole resonator 200 (e.g., each of the fiber segments) can be assembled along a v-groove or within a glass tube or ferrule sleeve to align each fiber segment with the optical axis of the neighboring fiber segment.

Referring now to FIG. 3, an evanescently-coupled multi-pole GRIN lens Fabry-Perot resonator (e-coupled multi-pole resonator) 300 includes two or more single GRIN lens Fabry-Perot resonators (e.g., two or more single GRIN lens Fabry-Perot resonators 100 from FIG. 1) arranged such that they are optically coupled through side-coupling. The e-coupled multi-pole resonator 300 includes Fabry-Perot sub-units similar to those described with respect to FIG. 1 above. For example, fiber segment 301 includes a first reflector 311 formed on a first end facet of the fiber segment 301 and a second reflector 312 formed on a second end facet of the fiber 301. The same configuration can be found on the multiple fiber segments 302-304.

Light entering a first fiber segment 301 through reflector 311 propagates through the fiber 301 and is retro-reflected by a second reflector 312. As described above, a standing wave pattern can exist in the fiber where the predominant resonant frequencies can be selected through appropriate configuration of the fiber segment 301 (e.g., fiber length, stress, etc.). Fabry-Perot resonators can produce evanescent waves that can couple to a neighboring fiber. The extent of optical coupling between neighboring single GRIN lens Fabry-Perot resonators, e.g., between the fiber segments 301 and 302 and associated reflectors, can predominantly depend on the transparency of the reflectors and is generally a fixed value. In general, a first fiber segment 301 is parallel to a second fiber segment 302 to maximize coupling efficiency.

In some embodiments of an e-coupled multi-pole resonator, a first reflector 311 that receives input light and a second reflector that receives output light 318 are partially-reflecting mirrors. The remaining reflectors, e.g., reflectors 312-317 in FIG. 3 can be highly reflective in order to minimize light leakage and maximize the amount of evanescent coupling between fiber segments 301-304.

The frequency spectrum of the e-coupled multi-pole resonator 300 output can be precisely tuned to provide optical filtering similar to the optical analog of a Butterworth or Chebyshev filter. In some embodiments, the degree of optical coupling between each of the fiber segments can be controlled through tuning of partial resonant frequencies of the elements (e.g., as described above with respect to FIG. 2), and the coupling strength.

In one embodiment, to allow optical side coupling between fiber segments, e.g., fiber segments 301 and 302, a gradient index waveguide can be side-shaved and treated (e.g., by polishing) to a desired evanescent field coupling strength. In some cases, each of the optical elements, e.g., fibers 301 and 302 can be joined at their respective shaved surfaces. Mating of these parts can be accomplished using methods known in the art, for example, using optical-quality adhesives, among other methods.

In some embodiments, the e-coupled multi-pole resonator 300 can be precisely tuned by shifting elements along their optical axis, thereby changing the interaction length. For example, still referring to FIG. 3, the Fabry-Perot resonator consisting of the fiber segment 301 and reflectors 311 and 312 can be longitudinally shifted relative to the Fabry-Perot resonator consisting of fiber segment 302 and reflectors 313 and 314. Likewise, any of the individual Fabry-Perot resonator sub-units (as just described) can be shifted relative to one another to provide an overall tunability of the e-coupled multi-pole resonator 300.

An e-coupled multi-pole resonators 300 can be assembled single mode fiber segments. Such a resonator 300 may differ in operation than a resonator utilizing multi-mode fiber segments because in the former case the fiber segments are typically not optically isolated. Such a resonator may display a frequency response having a sharp slope and flat top simultaneously.

Other variations are possible, For example, while not explicitly described, it will be understood that a multi-pole GRIN lens Fabry-Perot resonator can include various combinations of serially-aligned and evanescently-coupled Fabry-Perot resonators (e.g., a combination of the embodiments of FIGS. 2 and 3). In any of the described embodiments, the reflectivity of one or more of the reflectors may differ from one another to provide a desired tunability component. Similarly, different fiber lengths may be used in the multi-pole resonator embodiments (e.g., FIGS. 2 and 3) in each of the fiber segments (e.g., fiber segments 201-205 in FIG. 2) or the resonator sub-units shown in FIG. 3.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations, enhancements and other implementations can be made based on what is described and illustrated in this patent application.

What is claimed is:

1. An optical device, comprising:
   a first fiber Fabry-Perot resonator comprising a first fiber segment, a first reflector formed on a first end facet of the first fiber segment and a second reflector formed on a second end facet of the first fiber segment; and
   a second fiber Fabry-Perot resonator optically coupled to the first fiber Fabry-Perot resonator, the second fiber Fabry-Perot resonator comprising a second fiber segment oriented to be parallel to the first fiber segment and located to have a portion that spatially overlaps with part of the first fiber segment and is optically evanescently coupled via sides of the first and second fiber segments to the first fiber segment, a third reflector formed on a first end facet of the second fiber segment and a fourth reflector formed on a second end facet of the second fiber segment, wherein a position of the second fiber segment can be shifted relative to the first fiber segment to adjust an interaction length for evanescent coupling between the first and second fiber segments.

2. The device as in claim 1, wherein the first fiber segment is a single-mode fiber segment.

3. The device as in claim 1, wherein the first fiber segment is a multi-mode fiber segment.

4. The device as in claim 1, wherein the first fiber segment is a single-mode gradient index fiber segment.

5. The device as in claim 1, wherein the first fiber segment is a multi-mode gradient index fiber segment.

6. The device as in claim 1, wherein the first fiber segment is a single-mode gradient index lens.

7. The device as in claim 1, wherein the first fiber segment is a multi-mode gradient index lens.

8. The device as in claim 1, comprising:
a third fiber Fabry-Perot resonator optically coupled to the second fiber Fabry-Perot resonator, the third fiber Fabry-Perot resonator comprising a third fiber segment oriented to be parallel to the second fiber segment and located to have a portion that is optically evanescently coupled to the second fiber segment, a fifth reflector formed on a first end facet of the third fiber segment and a sixth reflector formed on a second end facet of the third fiber segment, wherein a position of the third fiber segment can be shifted relative to the second fiber segment to adjust an interaction length for evanescent coupling between the second and third fiber segments.

9. An optical device, comprising:
a first fiber segment,
a first reflector formed on a first end facet of the first fiber segment;
a second reflector formed on a second end facet of the first fiber segment and being partially reflective and partially transmissive;
a second fiber segment oriented to be parallel to the first fiber segment and located downstream from the first fiber segment to receive light from the first fiber segment, the second fiber segment having a first end facet in contact with the second reflector and a second end facet; and
a third reflector formed on the second end facet of the second fiber segment, wherein the first fiber segment, the first reflector and the second reflector form a first Fabry-Perot resonator that is optically coupled to a second Fabry-Perot resonator formed by the second fiber segment, the second reflector and the third reflector, and the first and second Fabry-Perot resonators are structured to exhibit resonator resonances at one or more common resonance wavelengths to collectively produce a flat-topped spectral response from the device with a sharp frequency cut-off.

10. The device as in claim 9, wherein the first fiber segment is a single-mode fiber segment.

11. The device as in claim 9, wherein the first fiber segment is a multi-mode fiber segment.

12. The device as in claim 9, wherein the first fiber segment is a single-mode gradient index fiber segment.

13. The device as in claim 9, wherein the first fiber segment is a multi-mode gradient index fiber segment.

14. The device as in claim 9, wherein the first fiber segment is a single-mode gradient index lens.

15. The device as in claim 9, wherein the first fiber segment is a multi-mode gradient index lens.

16. The device as in claim 9, wherein the first, second and third reflectors have different reflectivities.

17. A method for setting a spectral response of an optical device, comprising:
providing a first fiber Fabry-Perot resonator that comprises a first fiber segment, a first reflector formed on a first end facet of the first fiber segment which changes a refractive index under illumination of UV light and a second reflector formed on a second end facet of the first fiber segment;
optically coupling a second fiber Fabry-Perot resonator to the first fiber Fabry-Perot resonator, the second fiber Fabry-Perot resonator comprising a second fiber segment oriented to be parallel to the first fiber segment and located to have a portion that spatially overlaps with part of the first fiber segment and is optically evanescently coupled via sides of the first and second fiber segments to the first fiber segment, a third reflector formed on a first end facet of the second fiber segment and a fourth reflector formed on a second end facet of the second fiber segment; and
shifting a position of the second fiber segment relative to the first fiber segment to adjust an interaction length for evanescent coupling between the second and third fiber segments to tune a spectral response collectively produced by the coupled first and second fiber Fabry-Perot resonators.

18. The method as in claim 17, comprising changing a stress in at least one of the first and second fiber segments, in addition to the exposure of the first fiber segment to the UV light, to tune the spectral response collectively produced by the coupled first and second fiber Fabry-Perot resonators.

19. The method as in claim 17, comprising exposing the first fiber segment to the UV light to change the refractive index to tune the spectral response collectively produced by the coupled first and second fiber Fabry-Perot resonators.

20. An optical device, comprising:
a first Fabry-Perot resonator comprising a first reflector formed on a first end facet of the first Fabry-Perot resonator and a second reflector formed on a second end facet of the first Fabry-Perot resonator, the first and second reflectors defining a first resonator optic axis directed from the first reflector to the second reflector; and
a second Fabry-Perot resonator comprising a third reflector formed on a first end facet of the second Fabry-Perot resonator and a second reflector formed on a second end facet of the second Fabry-Perot resonator, the third and fourth reflectors defining a second resonator optic axis directed from the third reflector to the fourth reflector, wherein the second Fabry-Perot resonator is placed side by side with the first Fabry-Perot resonator so that the first and second optical axes are parallel to each other and the first and second Fabry-Perot resonators are optically coupled to each other via sides of the first and second Fabry-Perot resonators,
wherein a position of the second Fabry-Perot resonator can be shifted relative to the first Fabry-Perot resonator to adjust an interaction length between the first and second Fabry-Perot resonators to tune a spectral response collectively produced by the coupled first and second Fabry-Perot resonators.

21. The device as in claim 20, wherein the first and second Fabry-Perot resonators are formed of materials sensitive to UV light to change refractive index values when exposed to the UV light to tune the spectral response collectively produced by the coupled first and second Fabry-Perot resonators.

22. The device as in claim 20, wherein the first and second Fabry-Perot resonators are sensitive to a stress to tune the spectral response collectively produced by the coupled first and second Fabry-Perot resonators when a stress on the first and second Fabry-Perot resonators is changed.

* * * * *